(12) United States Patent
D'Ambrosio et al.

(10) Patent No.: US 11,353,015 B2
(45) Date of Patent: Jun. 7, 2022

(54) BRUSHED ELECTRIC MOTOR

(71) Applicant: INTERNATIONAL POWER COMPONENTS SRL, Giussano (IT)

(72) Inventors: Giovanni D'Ambrosio, Mariano Comense (IT); Roberto Italo Bianchi, Paina di Giussano (IT)

(73) Assignee: INTERNATIONAL POWER COMPONENTS SRL, Giussano (IT)

(*) Notice: Subject to any disclaimer, the term of this patent is extended or adjusted under 35 U.S.C. 154(b) by 1118 days.

(21) Appl. No.: 15/215,673

(22) Filed: Jul. 21, 2016

(65) Prior Publication Data

US 2017/0025917 A1 Jan. 26, 2017

(30) Foreign Application Priority Data

Jul. 21, 2015 (IT) .................. 102015000036442

(51) Int. Cl.

| | |
|---|---|
| H02K 5/12 | (2006.01) |
| H02K 5/136 | (2006.01) |
| H02K 5/24 | (2006.01) |
| F04B 43/04 | (2006.01) |
| H02K 11/026 | (2016.01) |
| F04C 15/00 | (2006.01) |
| F04D 13/06 | (2006.01) |

(Continued)

(52) U.S. Cl.
CPC ............ *F04B 43/04* (2013.01); *F04C 15/008* (2013.01); *F04D 13/06* (2013.01); *H02K 5/136* (2013.01); *H02K 5/145* (2013.01); *H02K 5/24* (2013.01); *H02K 11/026* (2013.01); *H02K 23/04* (2013.01); *H02K 2211/03* (2013.01)

(58) Field of Classification Search
CPC ................. H02K 5/24; H02K 5/136; H02K 5/14–5/148; H02K 5/1285; H02K 5/132
USPC ............................ 310/87, 88, 239
See application file for complete search history.

(56) References Cited

U.S. PATENT DOCUMENTS 4,342,929 A * 8/1982 Horne ................ H02K 1/185
310/43
4,587,450 A * 5/1986 Ozaki ................ H02K 1/2726
29/598

(Continued)

FOREIGN PATENT DOCUMENTS

| DE | 102013224458 A1 * | 5/2015 | ............. H03H 7/427 |
| WO | WO-03007458 A2 * | 1/2003 | ............. H02K 5/148 |

OTHER PUBLICATIONS

Machine Translation, STAHR, WO-03007458-A2, Jan. 2003. (Year: 2003).*

*Primary Examiner* — Thomas Truong
(74) *Attorney, Agent, or Firm* — Sughrue Mion, PLLC

(57) ABSTRACT

Brushed electric motor (10), comprising an outer case (11), two brushes and further a rotor (30) having a first inner end (31) and a second outer end (32) which is inserted within the outer case (11), the brushed electric motor (10) is usable in environments with a risk of fire or explosion or in presence of potentially explosive or flammable fluids, and comprises at least a filler element (20) made with a polymer based material which is positioned internally to the outer case (11) of said brushed electric motor (10) for minimize the free volume within the brushed electric motor (10) itself and for allow at the same time to maintain a high power and high performance characteristics of the brushed electric motor (10), by minimizing the possibility of triggering a burst or fire.

15 Claims, 3 Drawing Sheets

(51) Int. Cl.
*H02K 5/14* (2006.01)
*H02K 23/04* (2006.01)

(56) References Cited

U.S. PATENT DOCUMENTS

| | | | | |
|---|---|---|---|---|
| 4,728,835 | A * | 3/1988 | Baines | H02K 5/145 |
| | | | | 310/239 |
| 4,829,254 | A * | 5/1989 | Baines | G01P 3/465 |
| | | | | 324/167 |
| 5,602,957 | A * | 2/1997 | Wille | H01R 39/381 |
| | | | | 318/248 |
| 5,801,467 | A * | 9/1998 | Volz | B60T 8/4022 |
| | | | | 310/43 |
| 6,927,522 | B2 * | 8/2005 | Skofljanec | H02K 23/66 |
| | | | | 310/239 |
| 2006/0028088 | A1 * | 2/2006 | McFarland | H01R 39/385 |
| | | | | 310/239 |
| 2015/0104339 | A1 * | 4/2015 | Fischer | F02M 21/0245 |
| | | | | 417/423.7 |
| 2016/0043618 | A1 * | 2/2016 | Lai | H02K 11/026 |
| | | | | 310/72 |
| 2017/0163126 | A1 * | 6/2017 | Schmiederer | H03H 7/427 |

* cited by examiner

BRUSHED ELECTRIC MOTOR

This application claims priority from Italian Patent Application No. 102015000036442 filed Jul. 21, 2015, the contents of all of which are incorporated herein by reference in their entirety.

The present invention relates to a brushed electric motor.

In particular said brushed electric motor can be used in environments with risk of fire or explosion or in presence of potentially explosive or flammable fluids.

Existing brushed electric motors do not allow the use in such conditions as the brushes create sparks and therefore can determine the onset of a fire or explosion.

For such applications brushless motors are used, namely the motor known with the English term "brushless" which, however, are more complicated to realize and also have on average greater costs in comparison to brushed motors.

In fact brushless motors have a construction and functioning completely different with respect to brushed electric motor, consequently the difference is not only the absence of the brushes.

Aim of the present invention is to provide a brushed electric motor which can be used in environments with risk of fire or explosion or in presence of potentially explosive or flammable fluids and which at the same time can have high performance characteristics of the electric motor itself.

Another aim is to provide a brushed electric motor which has a reduced volume and a reduced number of components.

Still another aim is to have a brushed electric motor which has a low noise level and which is economic.

Further aim is to have a brushed electric motor which is economically advantageous.

These aims according to the present invention are achieved by providing a brushed electric motor as described in claim 1.

Further features of the invention are highlighted by the subsequent claims.

Features and advantages of a brushed electric motor according to the present invention will become more evident from the following exemplary and non-limiting description, with reference to the attached schematic drawings in which.

Figure 1:
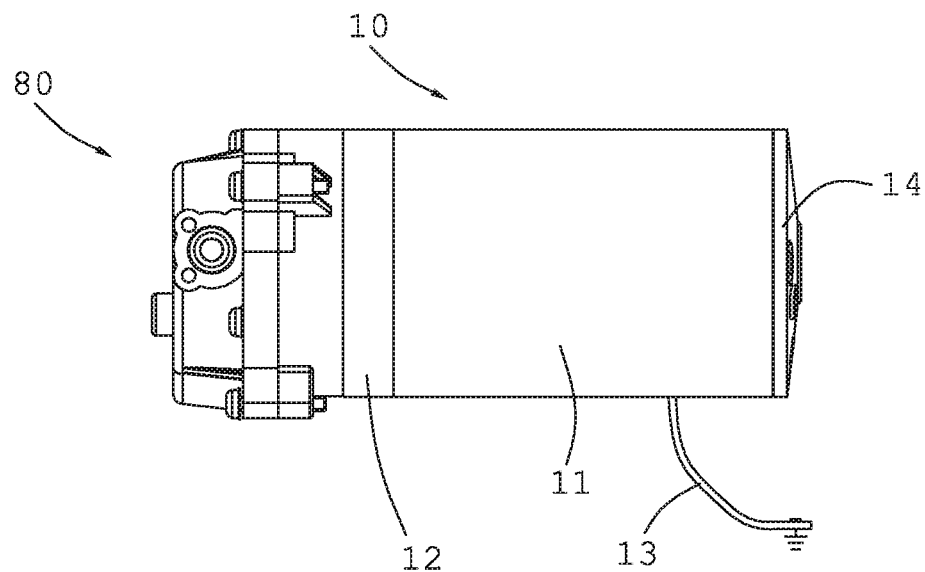
FIG. 1 is a right side elevation view of a preferred form of embodiment of a brushed electric motor and of a preferred form of embodiment of a pump for fluids according to the present invention.
Figure 2:
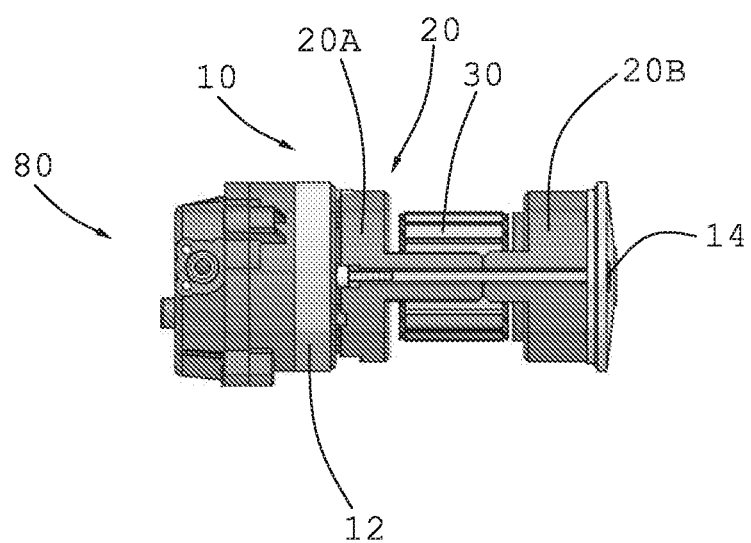
FIG. 2 is a right side elevation view of a detail of FIG. 1 without the external case.
Figure 3:
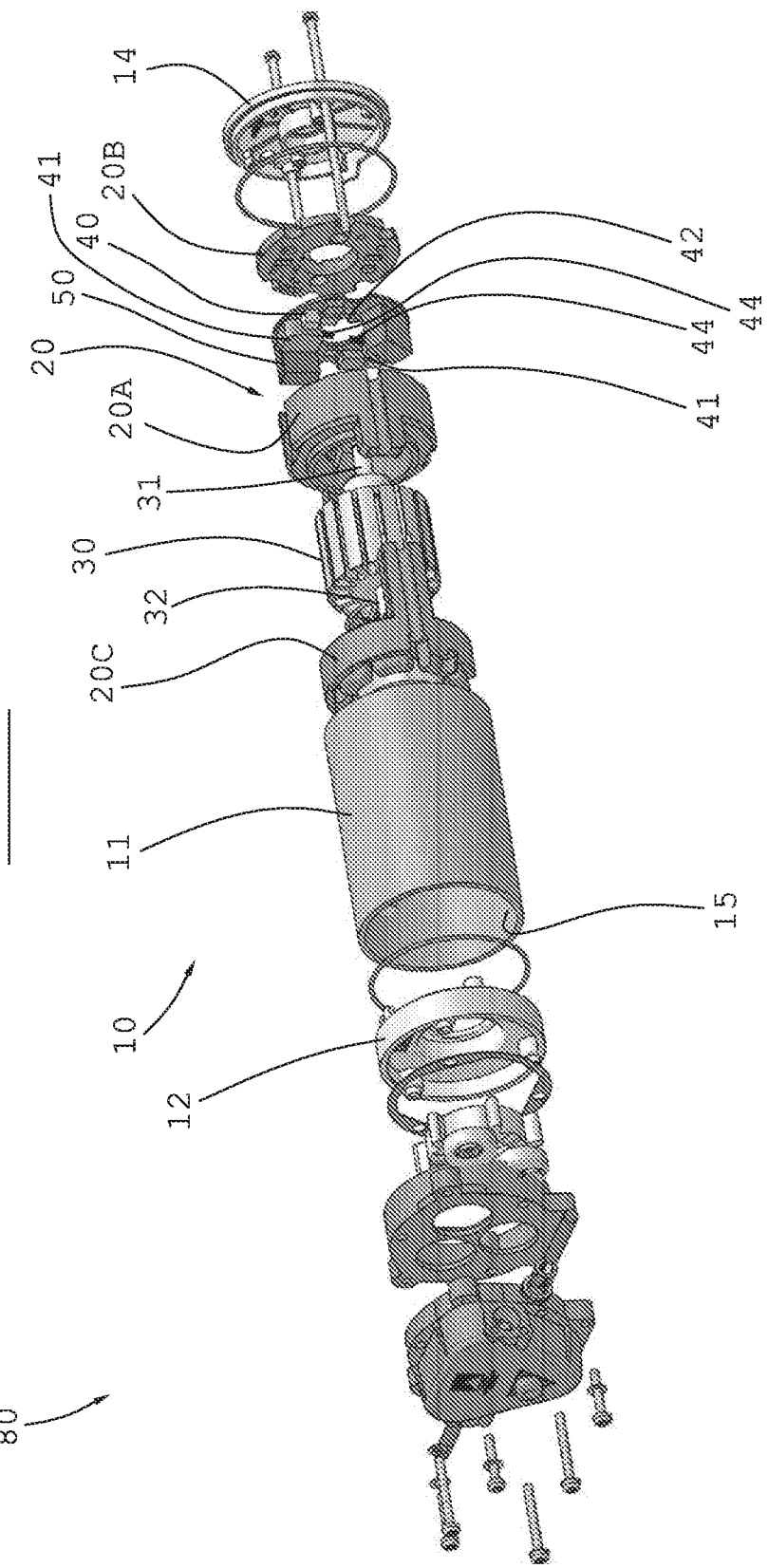
FIG. 3 is an exploded perspective view in a right side elevation of a preferred form of embodiment of a brushed electric motor and of a preferred form of embodiment of a pump for fluids according to the present invention.
Figure 4:
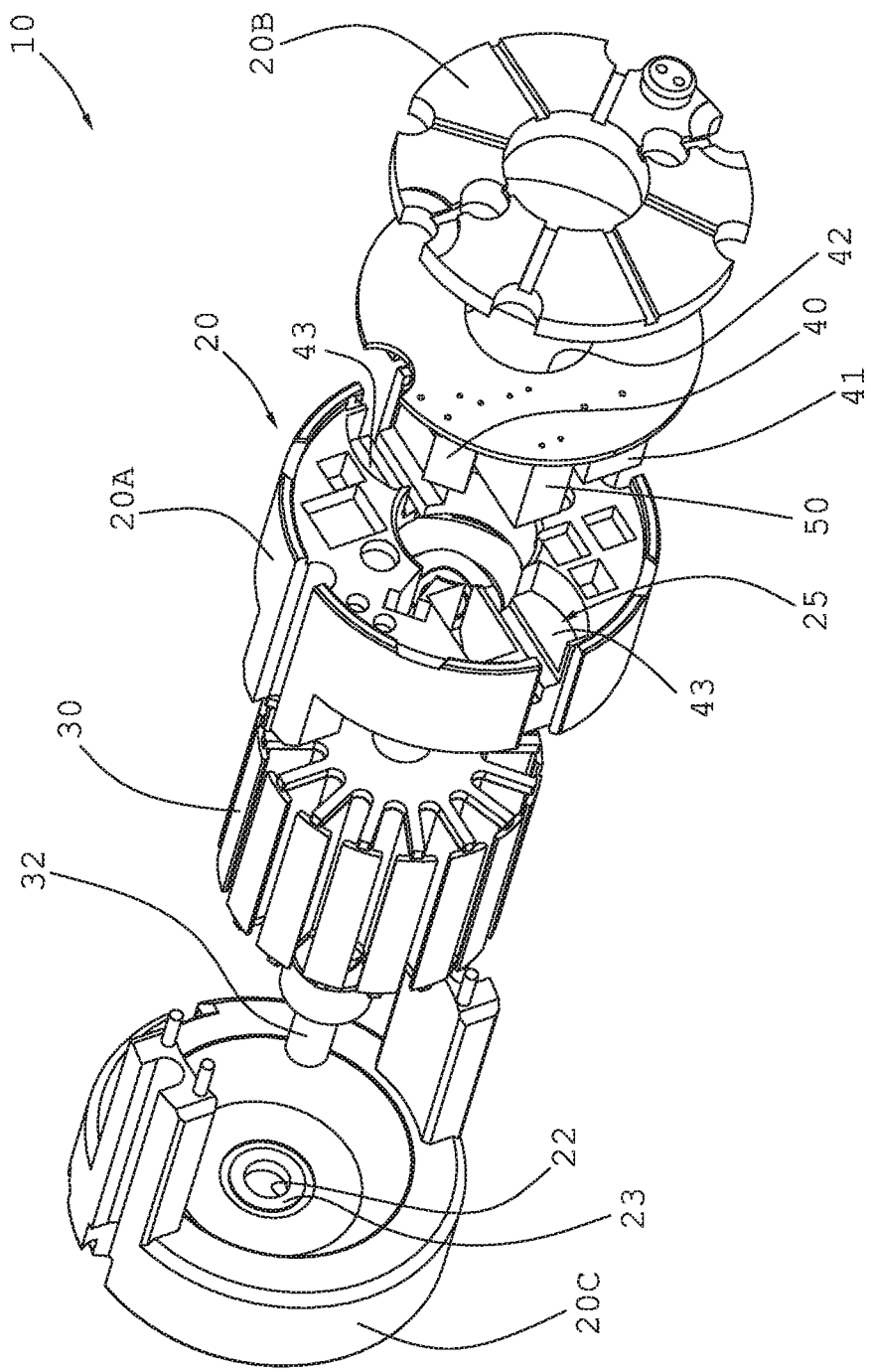
FIG. 4 is an exploded perspective view in a left side elevation view from behind of a preferred form of embodiment of a detail of a brushed electric motor according to the present invention.

With reference to the figures, a brushed electric motor 10 is shown, that is equipped with sliding contacts, in particular with a direct current, in particular usable in environments with risk of fire or explosion and/or in presence of potentially explosive or flammable fluids.

According to the present invention said brushed electric motor 10 comprises at least one filler element 20 made with a polymer based material which is positioned internally to said brushed electric motor 10, for minimize the free volume within said brushed electric motor 10 itself, and in particular for avoid a reduction in size of the entire brushed electric motor 10 itself, and for allow at the same time to maintain an high power and great performance characteristics of said brushed electric motor 10, so advantageously minimizing the possibility of triggering of a burst or fire, in other terms by minimizing the probability of triggering a deflagration or a combustion in the case of use of said brushed electric motor 10 in environments with risk of fire or explosion or in presence of potentially explosive or flammable fluids.

In particular said at least one filler element 20 permits to reduce the free volume within said brushed electric motor 10 below a predetermined volume, in particular lower than 100 $cm^3$, below which the probability of fire and/or explosion of a determined fluid is drastically reduced, and at the same time it permits to maintain high performance characteristics of said brushed electric motor 10 and also permits to convert the existing brushed electric motors for use the same for applications in presence of flammable fluids or explosives.

In particular said brushed electric motor 10 comprises two brushes and an external case 11 preferably metallic and having an internal cavity 15 within which said at least one filler element 20 is inserted, and also said brushed electric motor 10 comprises a rotor 30, having a first inner end 31 and a second outer end 32, which is inserted within said external case 11.

This allows to further reduce the risk of explosion or fire, as said external case 11 allows in part to absorb any possible electric strokes through a grounding electric connection 13, of which said brushed electric motor 10 is preferably provided.

Another advantage is that existing brushed motors can be converted, by inserting in the same said at least one filler element 20, for use of the same with fluids which are at risk of a fire or explosion without necessarily using a different type of electric motor of the type known with the term "brushless", which does not have such kind of problems as they do not generate sparks or electric discharges during its operation, being in fact brushless.

Preferably said at least one filler element 20 is also vibration-damping and soundproof, that is it contributes to the attenuation of noise and vibrations produced by said brushed electric motor 10.

Advantageously, this allows the use of a brushed electric motor 10 by also minimizing noise emissions.

Preferably said brushed electric motor 10 comprises a printed circuit board 40, which is inserted within said external case 11, and in particular within said internal cavity 15.

Preferably said at least one filler element 20 has an housing 25 for said printed circuit board 40 for avoid the so-called "tracking" problem, hence for avoid short circuits due to dusts produced by the brushes which can be positioned on said electric circuit or on contacts of the components present on said printed circuit board 40 and in particular in the presence of high humidity.

Preferably said brushed electric motor 10 comprises two brush holders 41 which are preferably mounted on said printed circuit board 40 and in particular which are integrated with said printed circuit board 40.

Preferably said housing 25 for said printed circuit board 40 has two housings 43 for enclose said two brush holders 41 and at least partially enclose said two brushes 44 for prevent the passage of predetermined conductive dusts in particular due to rubbing of said two brushes 44 on a first inner end 31 of said rotor 30 and for allow to the portion of said two brushes 44 projecting inside the same to contact said first internal end 31 of said rotor 30.

Preferably said rotor 30 is of the completely automatic wound type and is preferably provided with 16 polar sections with a 32 blade collector.

Advantageously in particular in the case of a direct current 230 v motor, lower electromagnetic emissions, lower noise emissions are obtained and is obtained a lower sparking of the brushes with a longer life of the same, by advantageously reducing also the "tracking" phenomenon of the dusts, and accompanied by an increased useful life of said brushed electric motor 10.

Preferably said brushed electric motor 10 comprises an electric noise suppression device 50, such as in particular, a high pass filter preferably of the passive type, preferably of the type known by the English term EMC, which is inserted inside said external case 11, wherein preferably said electric noise suppressor device 50 is connected to said two brushes of said brushed electric motor 10 for attenuate frequencies higher than the frequency of the electricity network and in particular frequencies between 150 kHz and 30 MHz, for attenuate electromagnetic interferences and for obtain an electromagnetic compatibility of said brushed electric motor 10.

Advantageously this allows to reduce the encumbrance, and allows to protect said electric noise suppression device 50 from external agents and in particular from environments with high humidity or with oxidizing or corrosive agents.

Advantageously this also allows to reduce the number of components as it is avoided an additional box or outer casing for housing said electric noise suppression device 50 and the related assembly, with a consequent reduction of production costs.

Preferably said electric noise suppression device 50, and in particular said high pass filter is mounted on said printed circuit board 40.

Advantageously this allows to reduce the overall dimensions, and to protect said electric noise suppression device 50 from external agents.

Preferably said printed circuit board 40 also comprises an electric circuit and a number of components connected together, a part of which makes said electric noise suppression device 50.

Also preferably said printed circuit board 40 also includes said two brush holders 41, for integrate in a single element all the electric components of said brushed electric motor 10.

Preferably said at least one filler element 20 comprises a second housing for said electric noise suppression device 50, for avoiding the so-called "tracking" problem, hence for avoid short circuits due to the dusts produced by the brushes which can be positioned on said electric circuit or on the contacts of the components on said printed circuit board 40.

Preferably said printed circuit board 40 comprises a central through hole 42, inside which an innermost end 31 of said rotor 30 is preferably inserted, and also said two brushes 44 are mounted on said printed circuit board 40 and also said two brushes 44 include corresponding ends protruding inside said through hole 42 and are preferably diametrically opposed one to another with respect to said central through hole 42.

In particular said housing 25 for said printed circuit board 40 reproduces as a negative, in particular on a side of said at least one filler element 20, the shape of said printed circuit board 40, preferably of said printed circuit board 40 and preferably also of its components, for completely cover the same and for prevent the positioning of dust or other agents on said printed circuit board 40, and also it advantageously permits an easy replacement of said printed circuit board 40 or other components on the same.

Preferably said printed circuit board 40 comprises two filters, each of which comprises an inductor and a capacitor, each filter of said two filters is connected to a correspondent brush of said two brushes.

Preferably said printed circuit board 40 comprises a third capacitor, a diodes bridge rectifier having two input poles and two output poles, wherein said two output poles are connected to said two brushes, furthermore said two input poles are mutually connected by said third capacitor, not shown, which is so connected in parallel respect to the same.

Preferably said printed circuit board 40 comprises a thermal protection element which is connected in series to an input pole of said diodes bridge rectifier, in particular said thermal protection element is able to interrupt the connection to the input pole of said diodes bridge rectifier in the event that the operative temperature is greater than a maximum predetermined admissible temperature for said diodes bridge rectifier.

In particular said thermal protection element comprises a memory shape metallic strip made with to different metals, which bend itself in the case of an operative temperature greater than a maximum predetermined admissible temperature.

Preferably said housing 25 comprises a plurality of traces or housings for each component of which said printed circuit board 40 is provided.

Preferably said housing 25 of said at least one filler element permits to insert and completely enclose at least a first face of said printed circuit board 40.

Preferably said housing 25 reproduces as a negative the shape of said printed circuit board on a board 40 and also of its components, in particular said housing 25 comprises a plurality of further housings for at least one part of the electronic or electric components protruding from said printed circuit board 40, of which said printed circuit board 40 is preferably provided, and in particular for each electronic or electric component of said printed circuit board 40 and preferably also of said electric noise suppression device 50, which is preferably mounted or integrated on said printed circuit board 40.

Preferably said at least one filler element 20 permits to minimize the free volume inside said brushed electric motor 10, in particular below a minimum volume necessary for triggering an explosion or a combustion in presence of flammable fluids or with a risk of explosion, and also at the same time it allows the integration of said printed circuit board 40 and other electric and/or electronic components inside said brushed electric motor 10, and in particular said at least one filler element 20 also integrates the function of a protective casing for the same within said printed circuit board 40 and of other electric and/or electronic components inside said brushed electric motor 10.

Preferably said at least one filler element 20 has a plurality of filler elements 20 made with a polymeric material for attenuate the noise emission of said brushed electric motor 10.

Preferably said at least one filler element 20 comprises a first filler element 20A and a second filler element 20B.

In particular within said first filler element 20A said first housing for said first face of said printed circuit board 40 is made, and also said second filler element 20B comprises a second housing for a second face of said printed circuit board 40, for completely enclose said electric circuit and at least one part of the components of said printed circuit board 40.

Preferably said at least one filler element 20 comprises a third filler element 20C which comprises a substantially central through hole 22 within which said second outer end 32 of said rotor 30 is inserted.

In particular said third filler element 20C comprises an annular gasket 23 for prevent the entry of water or fluids into a portion of said brushed electric motor 10 in which said printed circuit board 40 is housed, preferably said annular gasket 23 is made integral or realized in a single piece with said third filler element 20C and in particular the same is made integral or realized in a single piece with said through hole 22 of the same.

In particular within said first filler element 20A and said third filler element 20C are positioned in opposite longitudinal portions with respect to said rotor 30, and also said first filler element 20A and said third filler element 20C comprise respective longitudinal peripheral portions for their mutual connection and for avoid a contact with said rotor 30 and maintain a correct mutual position and also advantageously for better absorb vibrations during operation of said brushed electric motor 10.

Preferably said respective longitudinal peripheral portions are provided with coupling means for mutually constrain said first filler element 20A and said third filler element 20C.

Besides preferably said first filler element 20A and said third filler element 20C and in particular also said respective peripheral longitudinal portions comprise a plurality of grooves for a corresponding plurality of tie rods which allow to close said brushed electric motor 10 and of which said brushed electric motor 10 is preferably provided.

Said outer case 11 has a cylindrical shape, and also said brushed electric motor 10 comprises a first closure element 12 and a second closure element 14 for closing said outer case 11 and in particular for closing two corresponding open ends of said outer case 11; said first closure element 12 and said second closure element 14 comprise corresponding annular gaskets which are positioned on a cylindrical outer surface of the same for high degree of protection from moisture and an high waterproofing degree so avoiding the entry of fluids, moisture and gas inside said brushed electric motor 10.

Advantageously, this allows to further reduce the presence of moisture internally to said brushed electric motor 10 further reducing the "tracking" phenomenon, hence the deposition of conductive dusts on said printed circuit board 40.

Preferably said second closure element 14 comprises a plurality of through holes for the insertion of said plurality of tie rods on which corresponding annular gaskets are inserted, for prevent the passage of water or other fluids or gases inside said brushed electric motor 10, and also in particular said plurality of tie rods is screwed in corresponding blind holes made starting from an inner face of said first closure element 12 for hermetically close said brushed electric motor 10 so preventing the passage of fluids and in particular of water inside said brushed electric motor 10.

Furthermore preferably said third filler element 20C comprises a groove which coupling with said first closure element 12 of said outer case 11 defines an inner chamber substantially waterproof and watertight, for further prevent the passage of water or fluids into a portion of said brushed electric motor 10 in which said printed circuit board 40 is housed.

Preferably said brushed electric motor 10 comprises said plurality of tie rods provided with corresponding gaskets.

In particular said brushed electric motor 10 comprises two permanent magnets and a rotor 30 comprising a plurality of windings or coils not shown in the figures, said two permanent magnets and said rotor 30 being inserted within said outer case 11; in particular said rotor 30 is positioned between said two permanent magnets which are opposite to each other with respect to a symmetry and rotary axis of said rotor 30 internally to a cavity 15 with which said outer case 11 is provided, and also said rotor 30 includes two cylindrical ends, a first inner end 31 and a second outer end 32 which is inserted in a through hole formed in particular inside a first closure element 12 of said outer case 11 and which protrudes externally to the same for define a shaft of said brushed electric motor 10 for transmitting a rotary movement.

Also in particular said brushed electric motor 10 comprises preferably a ball bearing which supports said first inner end 31 of said rotor 30, for allow the free rotation of said rotor 30.

Preferably said polymeric based material is a polyamide based material, preferably nylon and in particular nylon 66.

Preferably said brushed electric motor 10 is an electric motor for the handling of fluids, in particular of liquids, and also preferably said brushed electric motor 10 is used for pumping a coolant fluid or a combustion fluid, in particular chosen between a coolant fluid for refrigerators or heat pumps, a liquid or gaseous hydrocarbon, which are affected by the problem of a ignition of combustion or burst in presence of electrical discharges or sparks.

Preferably said brushed electric motor 10 comprises an electric power cable having in particular also an electric cable for the grounding of the metal parts and in particular connected to said preferably metallic outer case 11.

According to another aspect of the present invention, it is provided a pump 80 for fluids, preferably of the membrane type, or of the rotary type with palettes or similar for the handling of liquids, in particular for coolant fluids or fuels, which comprises a brushed electric motor 10 having one or more of the previously described features and/or according one of the previously described variant of realization.

In particular said pump 80 for fluids is integrated with said brushed electric motor 10 for reduce the number of components and for limit the overall dimensions.

Preferably said pump 80 comprises a pumping head which is integrated with said brushed electric motor 10, which is in particular integrated to an end of the same, and preferably which is connected to said first closure element 12 of said brushed electric motor 10.

This advantageously allows to avoid the burst of said fluid which is pumped by said brushed electric motor 10, while maintaining high electrical performance of the same.

Furthermore this allows to maintain a reduced weight and to minimize noise emissions, in the case where said pump 80 is used for a water purifier with reverse osmosis.

Preferably said first closure element 12 of said brushed electric motor 10 defines with said pumping head a second air chamber which allows to further reduce the passage of said fluid internally to said brushed electric motor 10.

According to a further aspect of the present invention, it is provided a use of said pump 80 for fluids with one or more of the following applications: reverse osmosis plants, carbonator-refrigerator device, water dispensers, coffee machines, vending machines.

It must be understood that the present invention is also referred to each of the previous devices or plants, each of which comprises at least one pump 80 of the type previously described which comprises at least a brushed electric motor 10 with one or more of the previously described features and/or according to one of the previously described variants.

It has thus been seen that a brushed electric motor according to the present invention achieves the previously outlined aims.

The brushed electric motor of the present invention thus conceived is susceptible of numerous modifications and variants, all falling within the same inventive concept.

Moreover, in practice the materials used and also their dimensions and components, may be of any kind according to the technical needs.

The invention claimed is:

1. A brushed electric motor (10) comprising:
an outer case (11),
two brushes (44) and
a rotor (30) having a first inner end (31) and a second outer end (32) which is inserted within said outer case (11),
characterized by comprising a grounding electric connection (13) and a first closure element (12) and a second closure element (14) for closing said outer case (11) and for closing two corresponding open ends of said outer case (11), said first closure element (12) and said second closure element (14) comprise corresponding annular gaskets which are positioned on a cylindrical outer surface of the same for an high degree of protection from moisture and an high waterproofing degree so avoiding the entry of fluids, moisture and gas inside said brushed electric motor (10), and further comprising at least one filler element (20) made with a polymer based material which is positioned internally to said outer case (11) of said brushed electric motor (10), for minimizing the free volume within said brushed electric motor (10) and for allowing at the same time to maintain a high power and high performance characteristics of said brushed electric motor (10), so minimizing the possibility of trigger of a burst or fire, and said outer case (11) is a metallic outer case (11) having a cylindrical shape which allows in part to absorb any possible electric strokes through said grounding electric connection (13).

2. Brushed electric motor (10) according to claim 1, characterized in that it comprises a printed circuit board (40) which is inserted internally to said outer case (11), and wherein said at least one filler element (20) comprises a housing (25) for said printed circuit board (40) for preventing short circuits due to dusts produced by said two brushes (44).

3. Brushed electric motor (10) according to claim 2, characterized in that it comprises two brush holders (41) which are mounted on said printed circuit board (40) and which are integrated with said printed circuit board (40), and wherein said housing (25) for said printed circuit board (40) comprises two housings (43) for enclose said two brush holders (41) and for at least partially enclose said two brushes (44) for preventing the passage of conductive dusts produced by rubbing of said two brushes (44) on said first inner end (31) of said rotor (30).

4. Brushed electric motor (10) according to claim 2, characterized by comprising an electric noise suppression device (50), which is inserted internally to said outer case (11), and also said electric noise suppression device (50) is connected to said two brushes (44) of said brushed electric motor (10) for attenuating frequencies higher than the frequency of the electric network and frequencies between 150 kHz and 30 MHz, for attenuating electromagnetic interferences and for obtaining an electromagnetic compatibility of said brushed electric motor (10).

5. Brushed electric motor (10) according to claim 2, characterized in that said housing (25) reproduces as an outer shape of said printed circuit board (40), and said housing (25) comprises a plurality of further housings for at least one part of the electronic or electric components protruding from said printed circuit board (40) of which said printed circuit board (40) is provided, and for each electronic or electric component of said printed circuit board (40) and also of said electric noise suppression device (50) which is mounted on or integrated with said printed circuit board (40).

6. Brushed electric motor (10) according to claim 2, characterized in that said printed circuit board (40) comprises a central through hole (42), within which a first inner end (31) of said rotor (30) is preferably inserted, said two brushes (44) are mounted on said printed circuit board (40) and also said two brushes (44) include corresponding ends and are diametrically opposed one to another with respect to said central through hole (42).

7. Brushed electric motor (10) according to claim 2, characterized in that said at least one filler element (20) comprises a third filler element (20C) which comprises a through hole (22) substantially central within which said second outer end (32) of said rotor (30) is inserted, said third filler element (20C) comprises an annular gasket (23) for preventing the entry of water or fluids within a portion of said brushed electric motor (10) in which said printed circuit board (40) is housed, and said annular gasket (23) is made integral or made in a single piece with said third filler element (20C) and the same is made integral or made in a single piece with said through hole (22) of the same.

8. Brushed electric motor (10) according to claim 7, characterized in that said third filler element (20C) comprises a groove which is coupled with an end of said outer case (11) and defines an inner substantially waterproof and watertight chamber, for further preventing the passage of water or fluids within a portion of said brushed electric motor (10) in which said printed circuit board (40) is housed, and said first filler element (20A) and said third filler element (20C) are positioned in opposite longitudinal portions with respect to said rotor (30) and also said first filler element (20A) and said third filler element (20C) comprise respective peripheral longitudinal portions for a connection between them and for preventing a contact with said rotor (30) and for maintaining a correct mutual position and also advantageously for better absorb vibrations during the operation of said brushed electric motor (10).

9. Brushed electric motor (10) according to claim 1, characterized by comprising an electric noise suppression device (50), which is a high pass filter, and which is mounted on a printed circuit board (40), and wherein said at least one filler element (20) comprises a second housing for an electric noise suppression device (50).

10. Brushed electric motor (10) according to claim 1, characterized in that said at least one filler element (20) is made of a plurality of filler elements (20), a first filler element (20A) and a second filler element (20B), which are made with a polymeric material for attenuating the noise emissions of said brushed electric motor (10).

11. Brushed electric motor (10) according to claim 10, characterized in that in said first filler element (20A) is made said first housing for a first face of a printed circuit board (40), and also said second filler element (20B) comprises a second housing for a second face of said printed circuit board (40), for completely enclose an electric circuit and at least a part of the components of said printed circuit board (40).

12. Brushed electric motor (10) according to claim 1, characterized in that said polymeric based material is a polyamide based material or nylon.

13. Brushed electric motor (10) according to claim 1, characterized in that it is a brushed electric motor (10) for the handling of fluids, and said brushed electric motor (10) is usable for pumping a coolant fluid or a combustion fluid, and which is chosen between a coolant fluid for refrigerators or heat pumps, a liquid or gaseous hydrocarbon, which are affected by the problem of an ignition of combustion or burst in the presence of electrical discharges or sparks, and said at least one filler element (20) is used to reduce the free volume within said brushed electric motor (10) below a predetermined volume less than 100 cm3, below which the probability of fire and/or explosion of a determined fluid is drastically reduced.

14. Brushed electric motor (10) according to claim 1, characterized in that said brushed electric motor (10) is a direct current electric motor (10) and comprises a plurality of permanent magnets inserted within said outer case (11).

15. A pump (80) for fluids, coolant fluids or fuels, which comprises a brushed electric motor (10) according to claim 1, where said pump (80) is integrated with said brushed electric motor (10).

* * * * *